July 7, 1936. G. H. BROWN 2,047,056
PORTABLE COMPARTMENT FOR SLEEPING OR SUN BATHING
Filed March 25, 1935 4 Sheets—Sheet 1
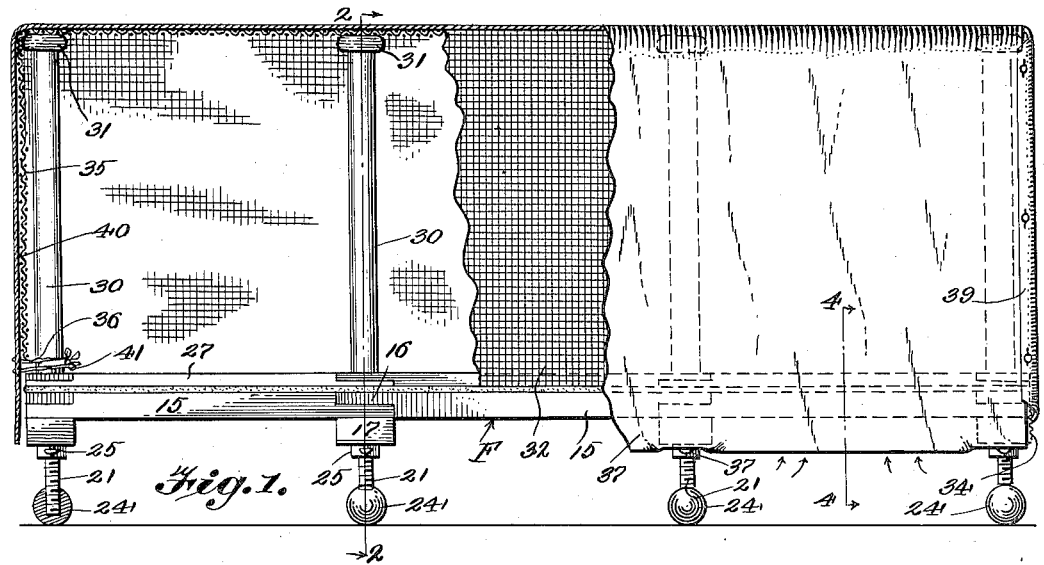
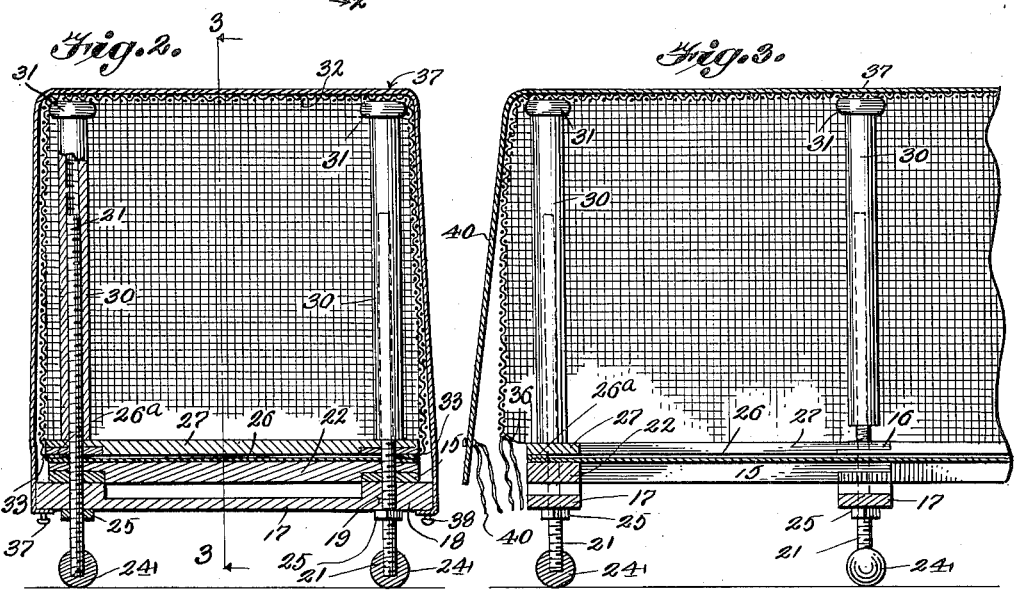
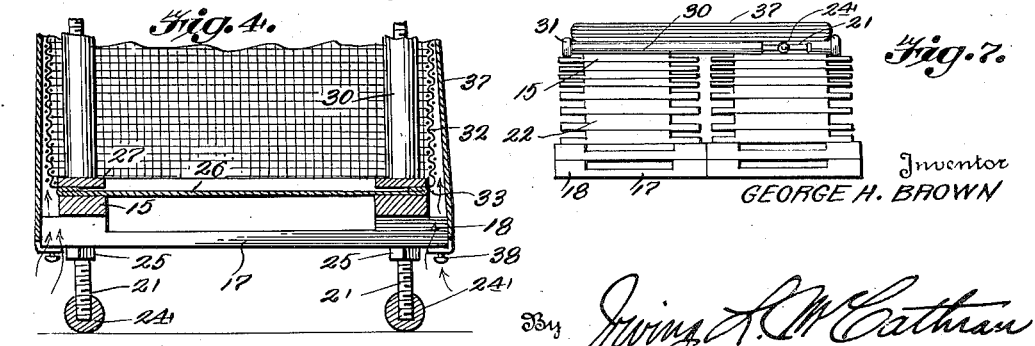
Inventor
GEORGE H. BROWN

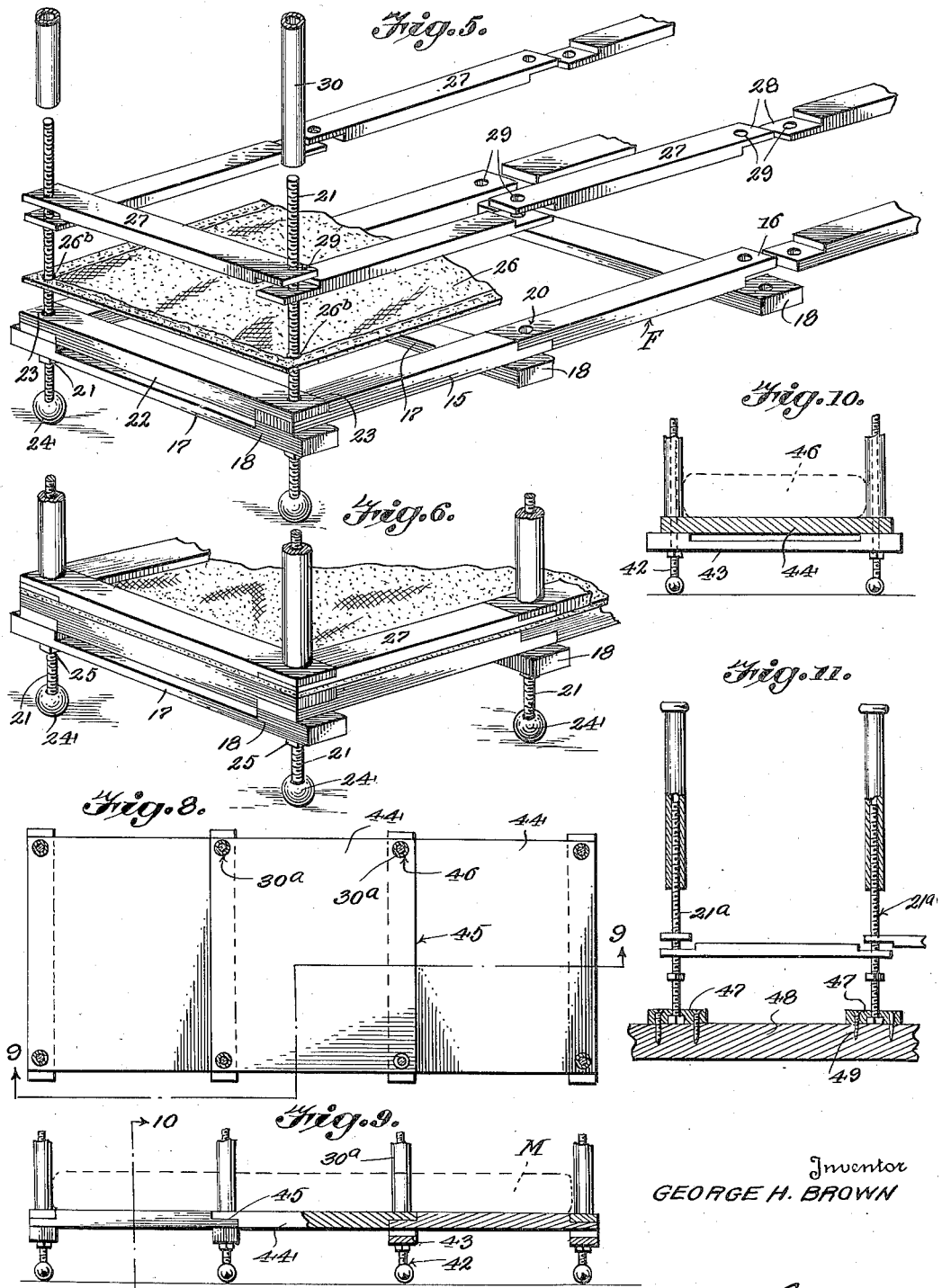

July 7, 1936.　　　　G. H. BROWN　　　　2,047,056
PORTABLE COMPARTMENT FOR SLEEPING OR SUN BATHING
Filed March 25, 1935　　　4 Sheets-Sheet 3
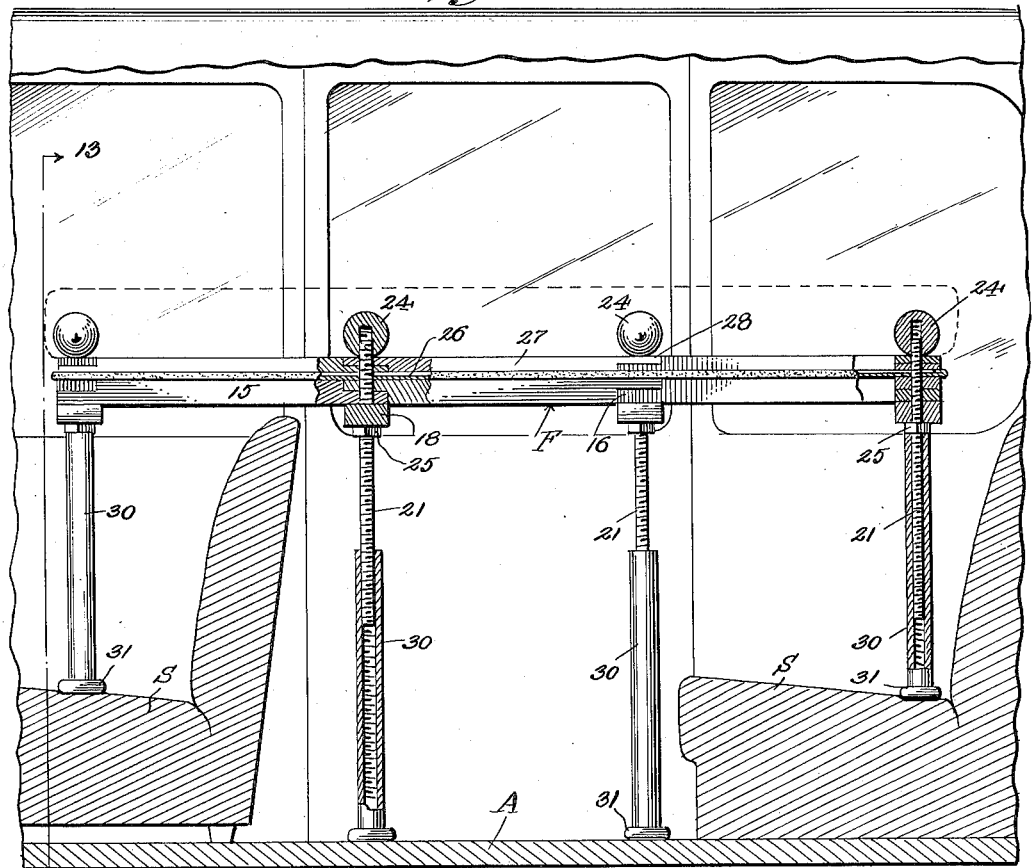
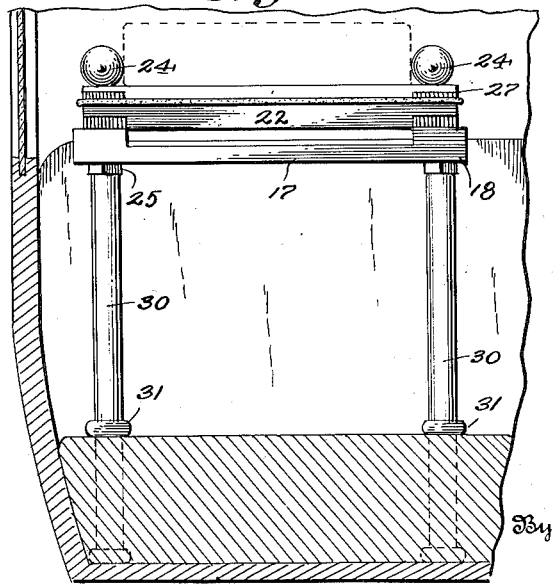
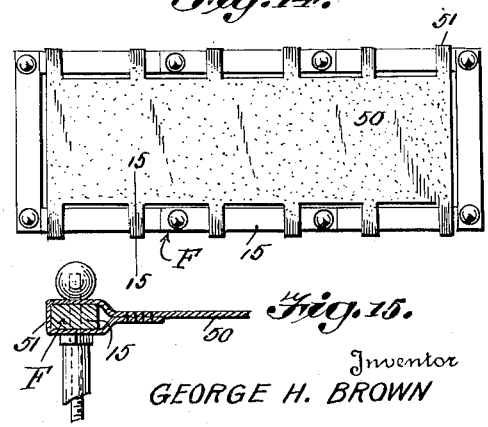
Inventor
GEORGE H. BROWN

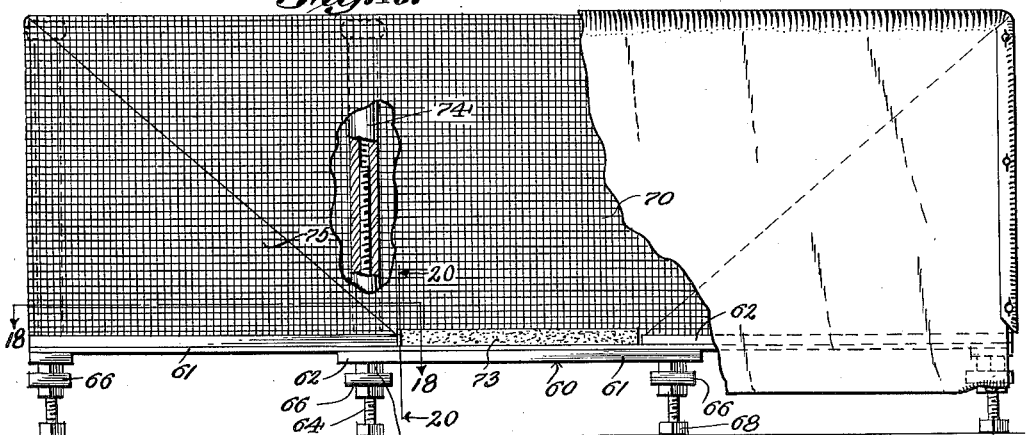
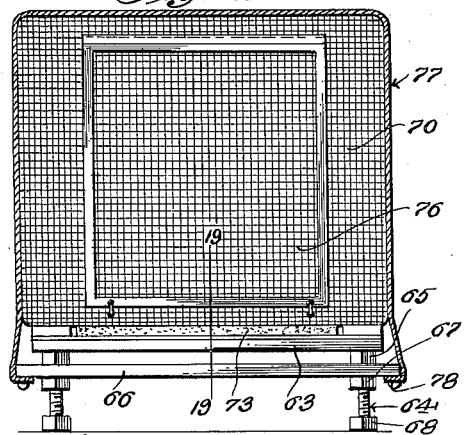
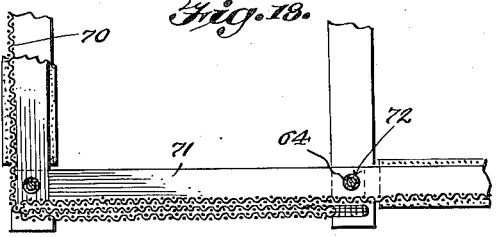
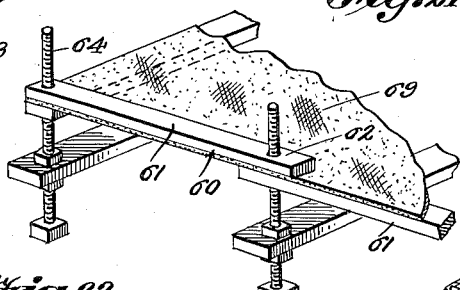
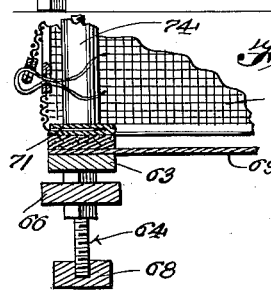
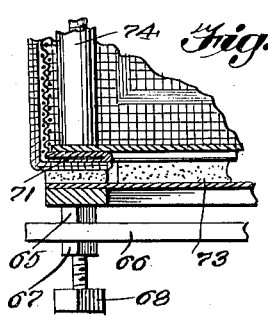
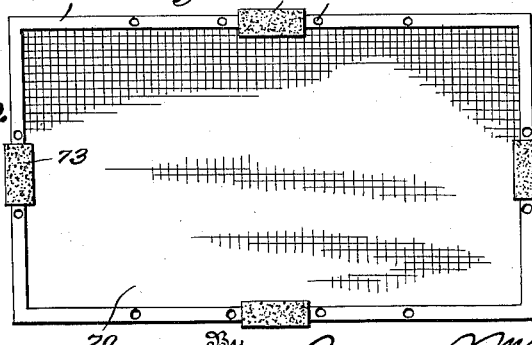
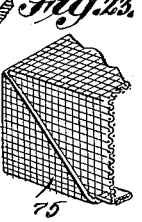
Inventor
GEORGE H. BROWN Patented July 7, 1936

2,047,056

UNITED STATES PATENT OFFICE 2,047,056

PORTABLE COMPARTMENT FOR SLEEPING OR SUN-BATHING

George H. Brown, New York, N. Y.

Application March 25, 1935, Serial No. 13,009

11 Claims. (Cl. 135—7.1)

This invention relates to portable compartments for outdoor sleeping and sun-bathing and has for one of its principal objects the production of a sleeping compartment formed of a plurality of separable sections whereby the sections may be disassembled and stacked or packed away for convenient transportation or storage.

A further object of this invention is the production of a simple and efficient portable compartment for outdoor sleeping and sun-bathing, the compartment being formed of a frame consisting of a plurality of sections which may be readily assembled to provide a commodious and comfortable sleeping or sun-bathing compartment.

A still further object of this invention is the production of a simple and efficient sleeping and sun-bathing compartment, the frame of which is formed of a plurality of sections which may be readily assembled to provide a sturdy as well as comfortable and light structure.

Other objects and advantages of the present invention will appear throughout the following specification and claims.

In the drawings:—

Figure 1 is a side elevation of the compartment in a set-up position, certain parts being shown in section;

Figure 2 is a vertical sectional view taken on lines 2—2 of Figure 1;

Figure 3 is a longitudinal sectional view through one end of the compartment showing the end flap partly open;

Figure 4 is a transverse sectional view taken on line 4—4 of Figure 1;

Figure 5 is a fragmentary perspective view of the frame of the compartment showing the various sections of the frame partly drawn apart or in separated relation;

Figure 6 is a fragmentary perspective view of one end of the frame in assembled relation;

Figure 7 is an end elevation of the frame in its knockdown and stacked relation;

Figure 8 is a top plan view of a modified form of the base of the sleeping compartment showing the standards in transverse section and illustrating a different type of platform for supporting a mattress;

Figure 9 is a section taken on line 9—9 of Figure 8;

Figure 10 is a transverse sectional view taken on line 10—10 of Figure 9;

Figure 11 is a vertical sectional view of a modified form of the device showing the manner in which it may be anchored in position upon a floor or other supporting medium;

Figure 12 is a side elevation, certain parts being shown in section, illustrating the device as it may be adapted for use as a bed mounted within an automobile;

Figure 13 is a vertical section taken on line 13—13 of Figure 12;

Figure 14 is a top plan view showing a modified form of the device illustrating the canvas bed bottom as being provided with loops for fitting over the supporting frame;

Figure 15 is a section taken on line 15—15 of Figure 14;

Figure 16 is a side elevation of a further modified form of my invention certain parts thereof being shown broken away and certain parts being shown in section;

Figure 17 is an end elevation of the outdoor sleeping and sun-bathing compartment shown in Figure 16, the outer covering being shown in transverse section;

Figure 18 is a partial horizontal section taken on line 18—18 of Figure 16;

Figure 19 is a partial vertical sectional view taken on line 19—19 of Figure 17;

Figure 20 is a partial vertical sectional view taken on line 20—20 of Figure 16;

Figure 21 is a drawn-apart perspective view of one corner of the frame shown in the embodiment illustrated in Figure 16;

Figure 22 is a plan view of the type of netting used in connection with the embodiment shown in Figure 16; and Figure 23 is a sectional perspective view of a corner of the netting shown in Figure 22 in its folded or set-up position.

By referring to the drawings, it will be seen that F designates the main frame of the sleeping or sun-bathing compartment, which main frame comprises a plurality of separable side sections 15 which are provided with operlapping end portions 16. A plurality of transversely extending cross members 17 are employed having thickened end portions 18, one of these transverse cross members 17 being employed at each joint of the side sections, and at the ends of the frame F, as shown in Figures 1 and 5.

The thickened end portions 18 of the cross members 17 are apertured, as at 19, and the overlapping portions 16 of the side sections 15 are also apertured, as at 20, and through these apertures portions 19 and 20 extend the vertically threaded bolts 21 thereby tying the side sections 15 and the cross members 17 together. The frame F carries at each end a transversely extending bracing cleat 22 having end portions 23 which interfit with the end side sections 15, as shown in Figure 5. As shown in the drawings, I employ vertically extending threaded rods or standards 21 extending through the overlapping portions 16 and also at the corners of the frame F, the rods at the corners of the frame extending through the overlapping portions 23 of the end bracing cleats 23. Each rod 21 is provided with an enlarged foot 24 which is adapted to rest upon the ground or floor supporting the sleeping and sun-bathing compartment, and nuts 25 are adjustably mounted upon the rods 21 and contact with the lower faces of the cross members 17 (note Figure 1), to support these cross members at a proper elevation with respect to the feet 24.

A canvas or other sheet 26 is fitted upon the top of the side sections 15 and the end cleats 22, the rods 21 passing therethrough, and sectional clamping strips 27 are fitted snugly upon the edges of the sheet 26 to firmly clamp the edges of the sheet 26 which constitutes a bottom for the bed. The clamping strips 28 are provided with overlapping ends similar to the overlapping portions 16, and are suitably apertured, as at 29, to receive the threaded rods 21.

Adjustable sleeves 30 are threaded upon the rods 21 and these sleeves 30 are provided with enlarged knobs or heads 31 in the nature of detachable nuts, at the upper ends thereof, the lower edges of the sleeves 20 being adapted to rest upon the upper faces of the clamping strips 27, as is illustrated in Figures 2 and 6. The sleeves 30 may, however, be adjusted to provide extensible members to support the covering 37, as shown in Figure 3, and to prevent the covering 37 from sagging.

A wire mesh screen 32 is adapted to be stretched over the knobs 31 at the upper ends of the sleeves 30 and this wire mesh screen 32 is then brought down over the sides of the compartment, the edges of the screen being clamped between the clamping strips 27 and the upper face of the canvas sheet or bed bottom 26, as indicated at 33 in Figure 2. The wire mesh screen 32 is also provided with an end flap 34 which may be closed over one end and a second end flap 35 which may constitute a door, and this end flap may be secured by means of cords or similar fastening means 36 which cords may be tied around the ends of the sleeves 30. It will be noted that the cross members 17 project slightly beyond the side rails 15, as indicated clearly in Figures 2, 5 and 6, and for sleeping purposes a covering of oil cloth or other weather proof material, indicated by the numeral 37, may be used. This covering 37 may be stretched over the wire mesh screen 32 to cover the top of the compartment and extend down the sides thereof and the edges may be secured by means of suitable buttons 38 carried by the under face of the cross members 17. An end flap 39 may be carried at one end of the covering 37 and a second end flap 40 may be employed to constitute a door 40, which second end door may be secured by tapes or cords 41, in the manner as shown in Figure 1.

As will be noted by considering Figures 2, 5 and 6, the cross members 17 by projecting beyond the side sections 15 will hold the covering 37 in spaced relation from the side members 15 thereby providing ventilation under the side edges of the covering 37, as indicated by the arrows shown in Figure 4.

For the purpose of storage or shipment, the various side sections 15, cross members 17, and other portions of the device may be stacked, as shown in Figure 7, so that they may be conveniently carried in a suit case or other similar storage container.

In Figures 8, 9 and 10, there is shown a modified form of the invention wherein standards 42 are employed carrying the transverse or cross members 43, these cross members 43 supporting bottom plates 44 which are overlapped, as at 45, to provide a sturdy base or bed bottom. The standards 42 extend upwardly through the ends of the cross members 43 and the apertures 46 of the plates 44 and tie the plates and cross members together. The sleeves 30a are adjustable on the rods 42 and clamp the overlapping portions 45 of the plates 44 in position. The standards or rods 42 may support a suitable canopy or covering similar to that previously described with respect to Figure 1. If desired, a mattress M shown in dotted lines, may be placed upon the plates 44, which plates constitute a support or bed bottom.

In Figure 11, there is shown a modified form of the invention wherein the standards 21a are anchored in position through the medium of anchoring blocks 47, which anchoring blocks may be secured to the floor 48 through the medium of securing elements 49. The standards 21a are similar to the bolts 21 described in connection with Figure 1.

It should be understood that the present device is particularly adaptable for use as a portable sleeping compartment for outdoor sleeping or camping, and may be used with or without the covering 47. The device is also adapted for use in sun-bathing in which case the covering 47 may be removed and only the wire mesh screen 32 employed. The wire mesh screen may be replaced by mosquito netting or other suitable material if desired, and any suitable covering may be substituted for the water-proof covering 47, and such changes may be made without departing from the spirit of the invention.

It should also be understood that by having the screen 30 adjustable upon the standards 21, the sleeves may be adjusted to the desired heighth and constitute an efficient support for the covering 47, as well as for the wire screen 32.

By referring to Figures 12 and 13 in particular, it will be noted that the device may also be used as a bed mounted within an automobile all of the same parts being utilized including the frame F embodying the side rails 15 and the clamping strips 27. The threaded rods 21 have their ends projecting through the side rails 15 and clamping strips 27 and carry the removable nuts or balls 24 at the upper ends. In this way the strips 27 and side rails 25 may be clamped together. The rods 21 also extend through the ends 18 of the cross members 17 and the parts are locked in position by means of the adjusting nuts 25. In the assembly shown in Figures 12 and 13, the positions of the rods 21 and sleeves 30 are reversed, the rods 21 and sleeves 30 constituting adjustable legs for supporting the frame F. The sleeves 30 are threaded upon the lower ends of the rods 21 as shown, the knobs 31 of the end legs resting upon the seats S of the automobile A, and the intermediate legs resting on the floor of the automobile A, as shown. Due to the fact that the sleeves 30 are adjustable upon the threaded rods 21, it will be seen that the rods 21 and sleeves 30 may be extended to provide adjustable legs.

The bed bottom 26 may be formed of canvas and may be provided with a reinforcing folded-over edge 26a, as is common in such fabric structures, and suitable reinforcing eyelets 26b may reinforce the apertures through which the rods 21 extend.

In Figures 14 and 15 there is shown a modified type of bed bottom 50 which is provided with side loops 51 for fitting over the side rails 15 of the frame F. Any number of these loops 51 may be employed to efficiently support the bed bottom 50 upon the frame F. The frame F is supported in a manner similar to that previously described, Figures 14 and 15 merely being for the purpose of illustrating a different connecting medium for attaching the bed bottom 50 to the frame F.

The device as is illustrated in Figure 11 may be attached to the top of an automobile or other vehicle, in a manner such as is illustrated in my previous application, Serial Number 724,998, filed May 10, 1934, relating to a sleeping compartment for vehicles.

In Figures 16 to 23 there is shown a still further modified form of my invention.

In the structure shown in these figures just mentioned, the frame 60 is illustrated which consists of a plurality of side rails 61, the ends of which are overlapped, as at 62. The frame 60 is also provided with transversely extending end members 63 which overlap the side rails, as shown in Figure 17.

The overlapping end portions 62 of the side rails 61, as well as the overlapping end portions of the end members 63 and the side rails 61 are firmly held together by means of the vertically extending threaded rods 64 which project through these overlapping portions, as shown in the drawings, particularly in Figures 18 and 21. Nuts 65 are threaded upon the threaded rods 64, which nuts 65 engage the under face of the overlapping portions of the frame 60, as shown. Transversely extending brace or cross-members 66 are carried by the vertically extending threaded rods 64 and are located under the overlapping portions of the rails of the frame 60. These cross-members 66 are in turned clamped in position through the medium of the nuts 67 which hold the cross-members in place and in abutting relation with the nuts 65. Suitable heads 68 may be mounted upon the lower ends of the threaded rods 64 and these heads may be of any shape or design which may be found suitable.

A suitable canvas or other bed bottom 69 may be mounted upon the frame 60 by being clamped between the overlapping end portions of the side rails 61.

In conjunction with the embodiment disclosed in Figure 16, I employ a mesh body 70 which may be of mosquito netting or other suitable material preferably formed of a rectangular frame having a binding 71 around its edges, which binding is provided with suitable apertures 72 through which the rods 64 may extend. Note Figure 18. The binding 71 carries at suitable intervals felt or other fillers 73 which are adapted to fit in between the spaced side rails 61 both on the side and at the ends of the frame as is indicated in Figure 16 and Figure 17. The body 70 is adapted to be mounted and supported in position upon the threaded sleeves 74 which are adjustably mounted upon the threaded rods 64 and the ends are folded backwardly on an angle, as indicated at 75, in Figures 16 and 23. The lower edges of the mesh body 70 are caught under the lower ends of the sleeves 74 thereby holding the mesh body 70 in position. The sleeves 74 support the mesh body 70 in a manner as previously described with respect to the sleeves 30 illustrated in Figure 1. If desired, a door 76 may be formed at one end of the mesh body 70. The cross members 66 have their ends extending slightly beyond the frame 60 or the side rails 61 and a weather-proof covering or hood 77 may be placed over the mosquito netting or wire mesh body 70 in a manner similar to the covering or hood 37, the covering 77 being secured at its edges 78 under the ends of the cross members 66. This will allow proper ventilation up under the lower edge of the covering 77.

It will be noted that one of the principal differences in the embodiment shown in Figures 16 to 23 over those previously described, is that the clamping strips 27 are eliminated.

Certain detail changes in the construction, combination and arrangement of parts may be employed without departing from the spirit of the invention so long as such changes fall within the scope of the appended claims.

Having described the invention, what I claim as new is:—

1. A compartment of the class described comprising a frame, a bottom secured to said frame, adjustable standards supporting said frame, and extensible members carried by said frame and adapted to support a covering.

2. A compartment of the class described comprising a frame formed of a plurality of interfitting side and cross sections, a flexible bottom, clamping strips fitting over the edges of said flexible bottom for clamping said flexible bottom in position, supporting rods extending vertically through said sections and through said bottom, and adjustable sleeves carried by said rods and engaging said clamping strips for holding said clamping strips in position.

3. A compartment of the class described comprising a frame formed of a plurality of interfitting side and cross sections, a flexible bottom, clamping strips fitting over the edges of said flexible bottom for clamping said flexible bottom in position, supporting rods extending vertically through said sections and through said bottom, adjustable sleeves carried by said rods and engaging said clamping strips for holding said clamping strips in position, and adjustable nuts carried by said rod and adjutably supporting said frame upon said rods.

4. A compartment of the class described comprising a frame formed of a plurality of interfitting side and cross sections, a flexible bottom, clamping strips fitting over the edges of said flexible bottom for clamping said flexible bottom in position, threaded supporting rods extending vertically through said sections and through said bottom, adjustable sleeves threaded upon said rods and engaging said clamping strips for holding said clamping strips in position, adjustable nuts carried by said rods and adjustably supporting said frame upon said rods, and supporting feet carried by the lower ends of said rods.

5. A compartment of the class described comprising a frame formed of a plurality of interfitting side and cross sections, a flexible bottom-clamping strips fitting over the edges of said flexible bottom for clamping said flexible bottom in position, supporting rods extending vertically through said sections and through said bottom, adjustable sleeves carried by said rods and engaging said clamping strips for holding said clamping strips in position, knobs carried by the upper ends of said sleeves, a covering spanning said knobs, and the edges of said covering being clamped under said clamping strips.

6. A compartment of the class described comprising a frame, a bottom secured to said frame, adjustable standards supporting said frame, extensible members carried by said frame and adapted to support a covering, and anchoring blocks engaging said standards for anchoring said standards in position.

7. A device of the class described comprising a frame, standards supporting said frame, a sectional bottom consisting of a plurality of overlapping plates carried by said standards, and means for clamping said sections in position on said frame.

8. A device of the class described comprising a frame, a bottom supported by the frame, adjustable standards detachably secured to the frame, said adjustable standards constituting legs for supporting the frame relative to an irregular surface.

9. A bed of the class described comprising a frame, a plurality of vertically extending threaded members having ends projecting through the frame, detachable nuts threaded upon the upper ends of said threaded members, adjustable nuts also threaded upon the threaded members and engaging the opposite side of the frame with respect to the detachable nuts whereby the threaded members may be clamped in adjusted relation with respect to the frame, and adjustable sleeves threaded upon the threaded members to constitute legs variable in length.

10. A device of the class described comprising a frame, means adjustably supporting the frame, sleeves adjustably mounted upon the aforementioned means, a mesh covering extended over the sleeves and spanning the distance from sleeve to sleeve to provide a shaped mesh covering, and said sleeves engaging the edges of the mesh covering and binding the edges of the mesh covering firmly upon said frame.

11. A device of the class described comprising a frame consisting of a plurality of rail sections having overlapping ends, threaded rods extending through said overlapping ends of said sections, nuts threaded upon said threaded rods and engaging said frame for binding the overlapping ends of the sections in assembled relation, cross members carried by said rods, nuts carried by the rods and engaging the cross members for binding the cross members in position, a mesh covering having a reinforcing binding around its edges, filler strips carried by said mesh covering and adapted to fit between the overlapping rail sections, sleeves adjustably mounted upon said threaded rods and binding the edges of said mesh covering upon said frame, and also supporting the mesh covering in a shaped form, the ends of the mesh covering being folded back on an angle and having the edges of the covering clamped in position by the lower ends of said sleeves.

GEORGE H. BROWN.